US006579082B2

United States Patent
Castellari

(10) Patent No.: US 6,579,082 B2
(45) Date of Patent: Jun. 17, 2003

(54) APPARATUS FOR THE INTERNAL DEPRESSURIZATION OF PLASTIC CONTAINERS THERMOFORMED BY MEANS OF BLOWING AND INTENDED FOR STERILE FILLING

(75) Inventor: Fabrizio Castellari, Bologna (IT)

(73) Assignee: Techne Technipack Engineering Italia S.p.A., San Lazzardo di Savena (IT)

( * ) Notice: Subject to any disclaimer, the term of this patent is extended or adjusted under 35 U.S.C. 154(b) by 265 days.

(21) Appl. No.: 09/847,371

(22) Filed: May 3, 2001

(65) Prior Publication Data

US 2001/0043960 A1 Nov. 22, 2001

(30) Foreign Application Priority Data

May 16, 2000 (IT) .................................... BO2000A0289

(51) Int. Cl.[7] .............................................. B29C 49/58
(52) U.S. Cl. .................... 425/150; 264/524; 425/535
(58) Field of Search ................... 425/535, 150; 264/525, 524

(56) References Cited

U.S. PATENT DOCUMENTS 4,946,366 A * 8/1990 Dundas et al. ............. 425/536
5,525,277 A * 6/1996 Joseph ...................... 264/40.6

FOREIGN PATENT DOCUMENTS

GB 1296612 A * 11/1972

\* cited by examiner

*Primary Examiner*—Robert Davis
(74) *Attorney, Agent, or Firm*—Larson & Taylor PLC

(57) ABSTRACT

The internal depressurization of thermoformed containers (C) is performed by means of the secondary suction circuit of a Venturi meter or ejector (15), the primary circuit of which is passed through by compressed air at pressure values regulated by a proportional valve (19) controlled by an electronic control unit (10) which detects the internal pressure or vacuum of the containers by means of a transducer (9) which is programmed by means of a special apparatus (11) and which, upon reaching of the predetermined vacuum inside the containers, activates means (Z) for closing the end portion of the said thermoformed containers. By means of a barometric sensor (21), the electronic control unit is also able to detect the atmospheric pressure of the working environment of the thermoforming machine, and the said control unit, upon a variation in the atmospheric pressure, automatically corrects the vacuum value associated with operation of the said closing means (Z), following a law whereby the said vacuum varies in an inversely proportional manner with respect to the variations in the atmospheric pressure.

6 Claims, 2 Drawing Sheets

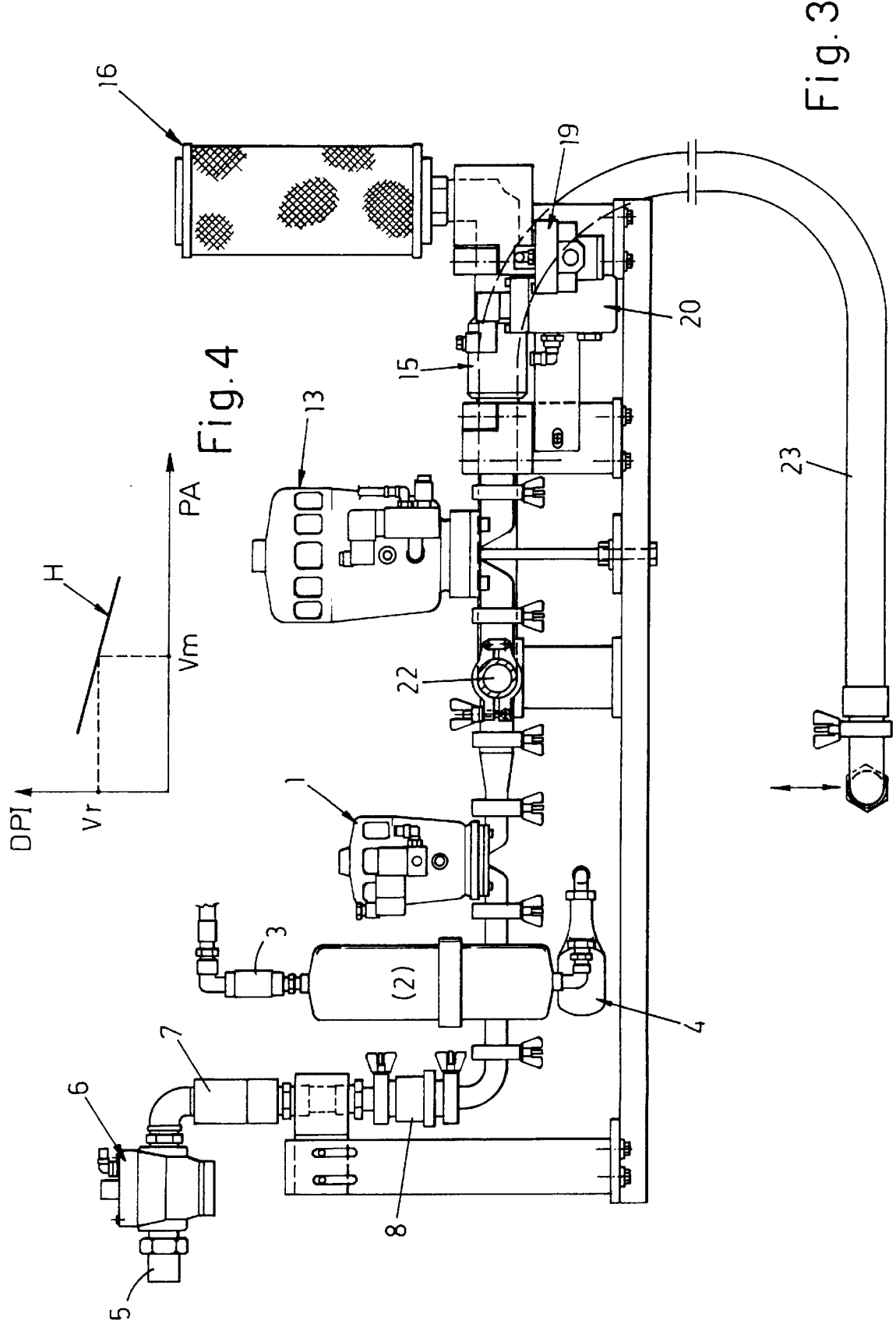

APPARATUS FOR THE INTERNAL DEPRESSURIZATION OF PLASTIC CONTAINERS THERMOFORMED BY MEANS OF BLOWING AND INTENDED FOR STERILE FILLING

DESCRIPTION

The invention has an industrial application in machines intended for thermoforming, by means of blowing, plastic containers which are intended for filling, in a sterile environment, with food or cosmetic products or for other uses and which, for these purposes, are blown with sterile air and emerge from the thermoforming moulds with a hermetically sealed, closed, end portion which is removed during filling of the containers performed in a controlled-atmosphere environment.

In order to prevent these containers from being deformed during the cooling step following the thermoforming step, before closing of the said end portion and extraction of the blowing nozzle from the latter, it is necessary to achieve inside the said containers a vacuum value which balances the increase in internal pressure caused by the residual heat of the plastic which forms the said containers.

In the prior art, the formation of the correct vacuum inside the containers thermoformed by means of blowing is achieved using costly apparatus which do not take into account the atmospheric pressure of the environment in which the said containers are produced and which, upon reaching the set vacuum value, isolate the container from the connection with the suction circuit, while the means which transversely close the said end portion of the said container are operated in synchronism. Small variations in the relative times of the abovementioned steps influence the value of the vacuum reached inside the containers and may result in production rejects.

The invention intends to overcome the limitations of the prior art with the following solution. When forming of the containers has been completed, the blowing nozzles, which are still sealingly engaged inside the said containers, are isolated from the blowing circuit and are connected to a discharge circuit connected to the suction mouth of a Venturi meter or ejector operated by an air stream, the pressure of which is modulated by an electronically controlled proportional valve. With this apparatus it is possible to create inside the containers the desired vacuum value, with a high degree of precision which may be maintained over time, such that the means for closing the end portion of the said containers are able to operate with any time variation from the instant the predefined vacuum value is reached, without production rejects arising, as instead occurs in the prior art.

The electronic control unit which controls the proportional pressure valve of the primary circuit of the ejector also takes into account the value of the atmospheric pressure of the external environment in which the containers are produced, so that the value of the vacuum created inside the thermoformed containers is determined in proportion to the value of the said atmospheric pressure. In other words, the value of the vacuum inside the containers will be corrected positively or negatively with respect to a reference value, depending on whether the atmospheric pressure varies more or less with respect to a predefined mean value.

Further characteristic features of the invention and the advantages arising therefrom will emerge more clearly from the following description of a preferred embodiment thereof, illustrated solely by way of a non-limiting example in the figures of the accompanying plates of drawings, in which:

FIG. 3 shows a side elevation view of a practical embodiment of the invention;

FIG. 4 shows the graph for variation in the internal vacuum of the containers in relation to the atmospheric pressure of the working environment.

Figure 1:
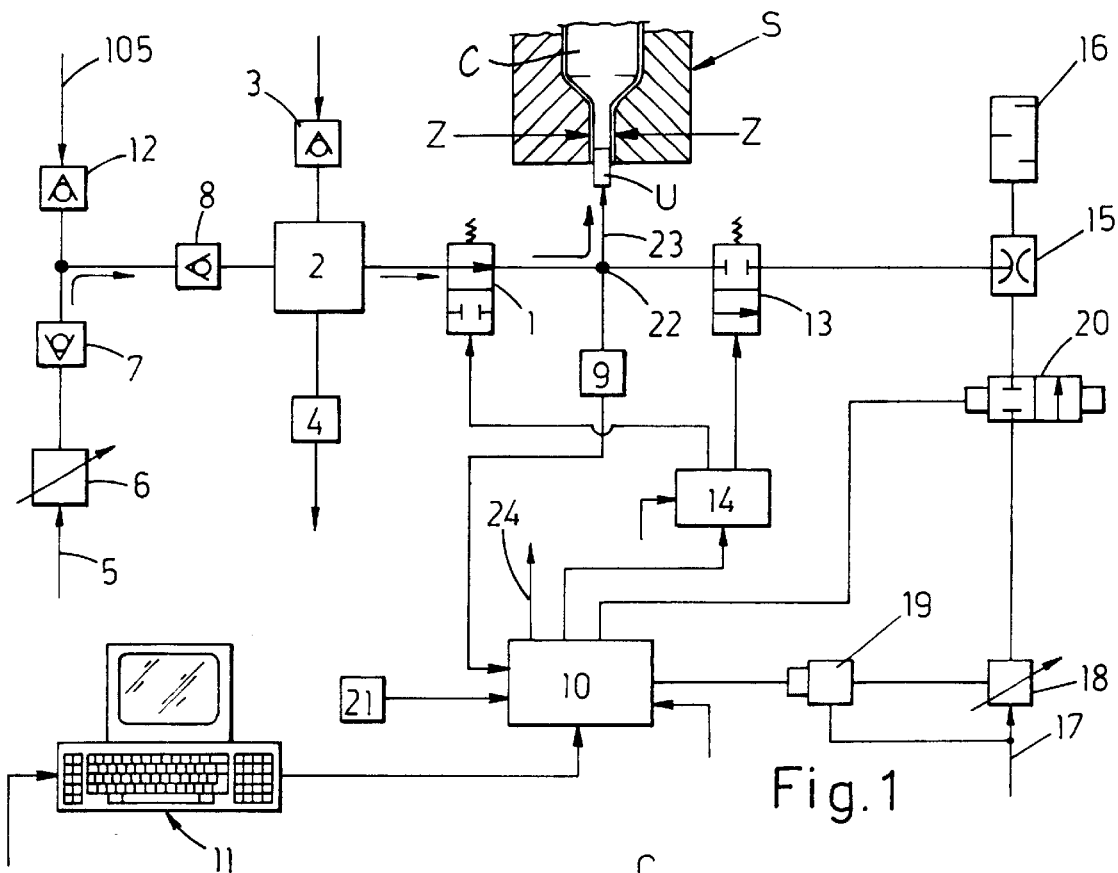
FIGS. 1 and 2 illustrate the general diagram of the apparatus in the thermoforming and depressurization condition of the containers, respectively.

In FIG. 1, S denotes the mould for thermoforming the containers C, provided with the blowing nozzle U and known means Z which in synchronism will close the end head of the container. During the container thermoforming step, the nozzle U is connected by means of an ON-OFF valve 1 to the outlet of a sterilization filter 2 which is purged for example with steam by means of the circuit which comprises a one-way valve 3 and an ON-OFF valve 4. The air for blowing the containers is supplied by the line 5, via a pressure regulator 6 and the one-way valves 7, 8, and reaches the inlet of the above mentioned filter 2. Branched from the nozzles U there is a pressure transducer 9 which generates an electric signal proportional to the pressure or vacuum created inside the said containers and which is linked to an electronic control unit 10 which manages automatic operation of the apparatus in question and which is connected to the programming/interrogation system 11. Upon reaching of the predetermined pressure inside the containers C, following completion of thermoforming of the said containers, the control unit 10 checks this condition by means of the transducer 9 and commands switching of the valve 1 as per FIG. 2 and interrupts the supply of pressurized air from the line 5, while air at the correct pressure continues to arrive from the branched line 105 and via the one-way valve 12 in order to prevent emptying of the circuit section between the valves 7 and 1.

Branched from the nozzles U there is an ON-OFF valve 13 controlled by the same interface 14 which controls the said valve 1 and which is controlled by the control unit 10. During thermoforming of the containers C, the valve 13 is closed as per FIG. 1. The outlet of the valve 13 is connected to the suction mouth of the secondary circuit of a Venturi meter or ejector 15 with suitable characteristics. The primary circuit of the ejector 15 is connected, at its outlet, to a filter or silencer 16 and is connected, at its inlet, to a compressed-air supply line 17 which is intercepted by an OFF-ON valve 20 and by a pressure regulator 18 driven by a proportional pressure valve 19. The means 19 and 20 are controlled by the control unit 10. During the step involving thermoforming of the containers C, the line 17 is active and the solenoid valve 20 is closed as per FIG. 1.

Figure 2:
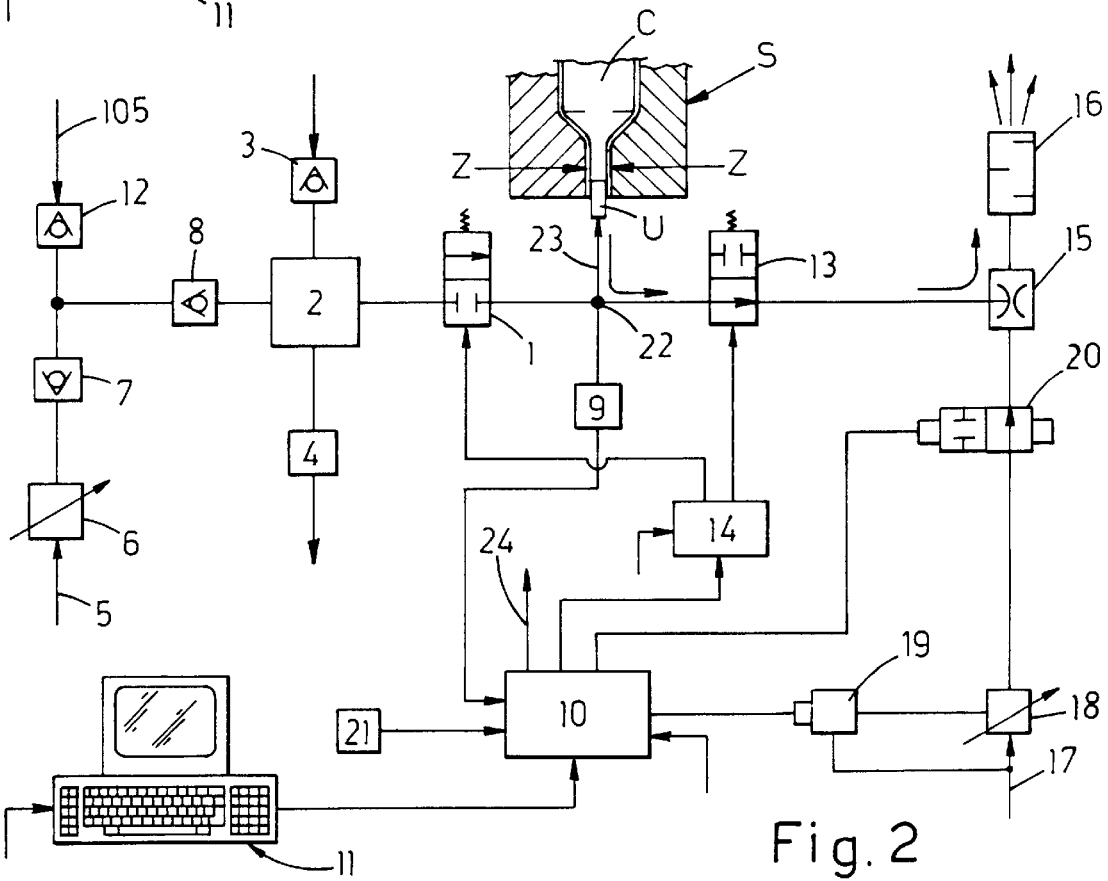

Following forming of the containers C, in correct sequence with switching of the valve 1, the control unit 10 switches the valves 13 and 20, as per FIG. 2. The nozzles U are thus connected to the suction point of the ejector 15, the primary circuit of which is passed through by compressed air supplied by the line 17. The residual pressure of the container C is thus discharged into the atmosphere via the ejector 15 and the filter 16 and, by means of the same ejector, the control unit 10 will create the programmed vacuum value by suitably modulating the proportional valve 19. By means of the transducer 9, the control unit 10 checks the value of the vacuum created inside the containers and compares this value with that of the atmospheric pressure which the said control unit 10 receives from a barometric sensor 21 situated in the working environment of the container thermoforming machine. FIG. 4 shows, purely by way of a non-limiting example, the graph H for variation of the vacuum DPI created inside the containers, in relation to the atmospheric pressure PA, and shows how the said vacuum DPI is inversely proportional to the variations of PA. In this diagram, Vr indicates the reference value of the vacuum DPI which is programmed in the electronic control unit 10 and which is related to a mean value Vm of the atmospheric pressure PA.

When the control unit 10 detects that the predetermined vacuum has been formed inside the containers C, in relation to the value of the atmospheric pressure, via the output 24, the said control unit 10 activates the means Z which transversely compress and sealingly close the end portion of the bottle C. In phase sequence, the valves 13, 20 and 1 are switched as per FIG. 1, the nozzles U are extracted from the thermoformed containers and the moulds are opened in order to discharge the said containers and are prepared for repetition of a new working cycle.

In FIG. 3, the various components of the apparatus are indicated by the same numbers in the diagram according to FIGS. 1 and 2. 22 denotes the junction to which the flexible pipe 23 linked to the nozzles U of the container thermoforming assembly is connected.

It is understood that the description refers to a preferred embodiment of the invention, with the omission of the constructional details relating to the Venturi meter 15, the proportional valve 19 and the control unit 10, since they may all be deduced and easily realized by persons skilled in the art.

What is claimed is:

1. Apparatus for the internal depressurization of plastic containers thermoformed by means of blowing and intended for sterile filling, characterized in that the said depressurization step is performed by means of the secondary suction circuit of a Venturi meter or ejector (15), the primary circuit of which is passed through by compressed air at pressure values regulated by a proportional valve (19) controlled by an electronic control unit (10) which detects the internal pressure or vacuum of the containers by means of a transducer (9) and which is programmed by means of a suitable programming apparatus (11) and which, upon reaching of the predetermined vacuum inside the containers, activates means (Z) for closing the end portion of the said thermoformed containers.

2. Apparatus according to claim 1, characterized in that the electronic control unit (10) intended for driving the proportional pressure valve (19) is designed to detect, in addition to the internal pressure or vacuum of the containers, by means of the said transducer (9), also the atmospheric pressure of the working environment of the thermoforming machine, by means of at least one special barometric sensor (21), the said control unit being designed to receive, via the said programming unit (11), the reference value (Vr) of the internal pressure (DPI) of the containers, correlated to a mean value (Vm) of the atmospheric pressure (PA), and also being designed to vary automatically the internal vacuum threshold, upon reaching of which the means (Z) for closing the end portion of the containers are activated, in accordance with the variations in atmospheric pressure with respect to the said mean value (Vm), following the law whereby the internal vacuum varies in an inversely proportional manner with respect to the said variations in the atmospheric pressure.

3. Apparatus according to claim 1, characterized in that the blowing nozzles (U) of the thermoforming machine are branched to a first ON-OFF valve (1) for sending the sterile compressed air for thermoforming the containers (C) and are also connected to a second ON-OFF valve (13) which is closed during the thermoforming step and which is opened at the end of this step, after closing of the said first valve, the outlet of this second valve being connected to the suction mouth of the Venturi meter (15), both the said valves (1, 13) being controlled by the electronic control unit (10) via a suitable interface (14).

4. Apparatus according to claim 1, in which a filter or silencer (16) is connected to the discharge mouth of the Venturi meter (15).

5. Apparatus according to claim 1, in which the primary circuit of the Venturi meter (15) is provided, immediately upstream of the latter, with a valve of the ON-OFF type (20) controlled by the said electronic control unit (10) which drives the proportional pressure valve (19).

6. Apparatus according to claim 1, characterized in that the line (17) which supplies the compressed air to the primary circuit of the Venturi meter (15) is provided with a pressure regulator (18) driven by the proportional pressure valve (19) controlled by the electronic control unit (10).

\* \* \* \* \*